(12) United States Patent
Pippin

(10) Patent No.: US 9,321,601 B2
(45) Date of Patent: Apr. 26, 2016

(54) AUTOMATED UNLOADER BASE BELT AND CONTAINER

(71) Applicant: James M. Pippin, Keller, TX (US)

(72) Inventor: James M. Pippin, Keller, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 166 days.

(21) Appl. No.: 13/834,233

(22) Filed: Mar. 15, 2013

(65) Prior Publication Data

US 2013/0230373 A1 Sep. 5, 2013

Related U.S. Application Data

(63) Continuation-in-part of application No. 13/091,583, filed on Apr. 21, 2011, now Pat. No. 8,651,794.

(60) Provisional application No. 61/326,876, filed on Apr. 22, 2010.

(51) Int. Cl.
| | | |
|---|---|---|
| *B60P 1/36* | (2006.01) | |
| *B60P 1/38* | (2006.01) | |
| *B65G 69/28* | (2006.01) | |
| *B65G 67/02* | (2006.01) | |
| *B65G 67/24* | (2006.01) | |

(Continued)

(52) U.S. Cl.
CPC . *B65G 67/24* (2013.01); *B60P 1/38* (2013.01); *B65G 35/04* (2013.01); *B65G 67/08* (2013.01)

(58) Field of Classification Search
CPC .......... B65D 88/68; B60P 1/36; B60P 1/365; B60P 1/38; B65G 67/20; B65G 65/44; B65G 67/24; B65G 67/08; Y10S 242/919; G65G 65/02

USPC ........ 160/23.1, 388, 390, 400, 402, 403, 404; 193/25 C; 198/308.1, 499; 222/392; 224/403; 296/100.11, 100.12, 100.15, 296/100.16, 100.18, 39.1, 39.2; 298/1 B; 4/502; 414/393, 395, 402, 527, 539, 414/572, 789.5, 927, 929; 52/3, DIG. 13
See application file for complete search history.

(56) References Cited

U.S. PATENT DOCUMENTS

| | | | | |
|---|---|---|---|---|
| 1,805,489 | A | * | 5/1931 | Kerr et al. .................. 296/183.1 |
| 2,328,397 | A | * | 8/1943 | Neuman ....................... 248/544 |
| 2,662,650 | A | * | 12/1953 | Russell ......................... 414/539 |

(Continued)

FOREIGN PATENT DOCUMENTS

| | | |
|---|---|---|
| DE | 102011002710 A1 | 7/2012 |
| WO | 2011133831 A1 | 10/2011 |

OTHER PUBLICATIONS

PCT Search Report mailed Jul. 13, 2011 corresponding to PCT International Application No. PCT/US11/33521 filed Apr. 22, 2011 (13 pages).

(Continued)

*Primary Examiner* — Gregory Adams

(57) ABSTRACT

A base belt for use with an automated unloading apparatus that can automatically unload a container having a plurality of items located on the base belt, and a container configured for use with an automated unloading apparatus. The base belt has a trailer end configured to be removably attached to a container. The base belt has an unloader end configured to be removably attached to the automated unloading apparatus. The container has a container body having an interior and an attachment point on the interior of the container.

12 Claims, 11 Drawing Sheets

(51) Int. Cl.
*B65G 35/04* (2006.01)
*B65G 67/08* (2006.01)

(56) References Cited

U.S. PATENT DOCUMENTS

| | | | | |
|---|---|---|---|---|
| 2,923,423 | A * | 2/1960 | Maney | 414/539 |
| 3,186,566 | A * | 6/1965 | Spinanger et al. | 414/395 |
| 3,435,950 | A | 4/1969 | Suverkrop | |
| 3,763,792 | A * | 10/1973 | Webb | 108/51.11 |
| 4,022,135 | A * | 5/1977 | Bauman et al. | 108/51.3 |
| 4,284,259 | A * | 8/1981 | McCaskill | 248/346.4 |
| 4,914,993 | A * | 4/1990 | Fabbri | 82/127 |
| 4,991,640 | A * | 2/1991 | Verkindt et al. | 160/368.1 |
| 5,156,518 | A * | 10/1992 | VanMatre | 414/527 |
| 5,163,801 | A * | 11/1992 | Nordstrom | 414/525.1 |
| 5,186,596 | A * | 2/1993 | Boucher et al. | 414/395 |
| 5,256,021 | A | 10/1993 | Keip | |
| 5,295,779 | A | 3/1994 | Mihalich | |
| 5,327,590 | A * | 7/1994 | Last | 4/502 |
| 6,429,776 | B1 * | 8/2002 | Alicot et al. | 340/572.1 |
| 6,655,893 | B2 * | 12/2003 | Kelly et al. | 414/393 |
| 6,663,335 | B2 * | 12/2003 | Benson et al. | 414/395 |
| 7,350,244 | B1 * | 4/2008 | Handley | 4/558 |
| 2004/0178671 | A1 * | 9/2004 | Smith | 298/1 B |
| 2005/0135907 | A1 * | 6/2005 | Romano et al. | 414/401 |
| 2005/0162277 | A1 * | 7/2005 | Teplitxky et al. | 340/572.8 |
| 2005/0240498 | A1 * | 10/2005 | Thaler | 705/29 |
| 2007/0188324 | A1 | 8/2007 | Ballin | |
| 2007/0212208 | A1 | 9/2007 | Hansl | |
| 2008/0257692 | A1 * | 10/2008 | Wallace | 198/810.02 |
| 2009/0169349 | A1 | 7/2009 | Reed | |
| 2009/0269183 | A1 | 10/2009 | Hollinrake | |

OTHER PUBLICATIONS

PCT International Search Report mailed Jul. 28, 2014 corresponding to PCT International Application No. PCT/US2014/028104 filed Mar. 14, 2014 (10 pages).

* cited by examiner

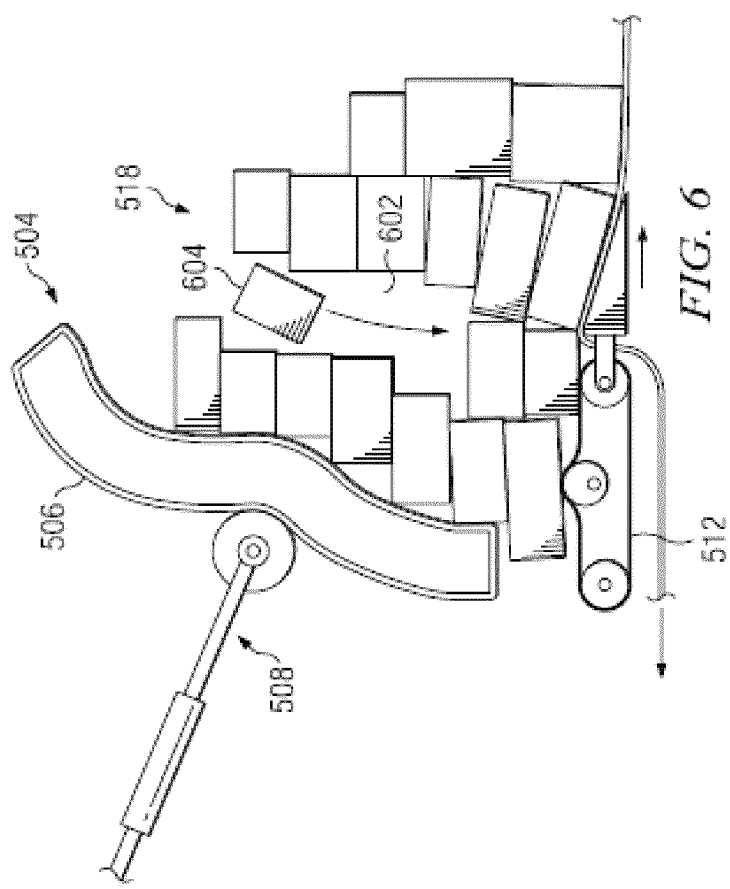
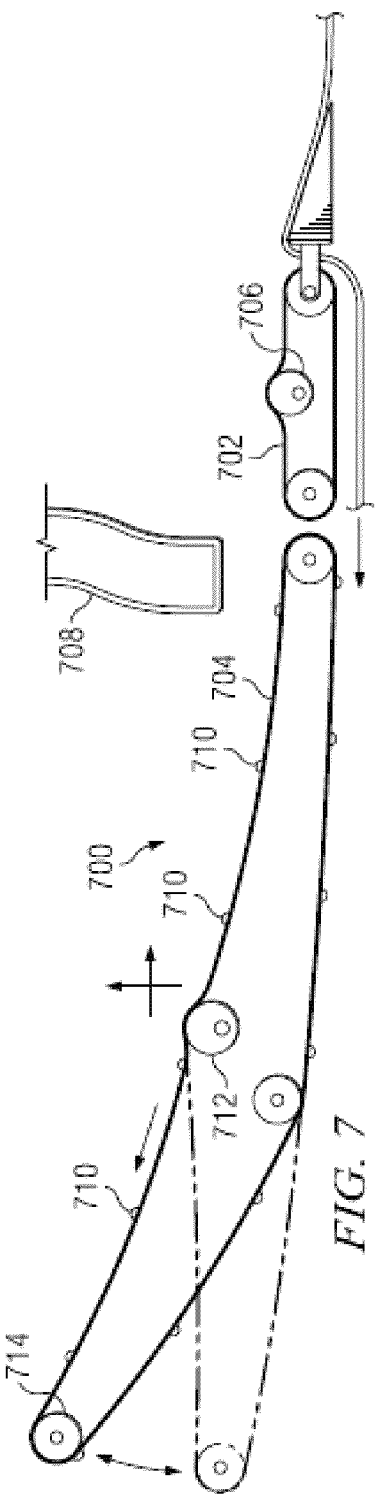

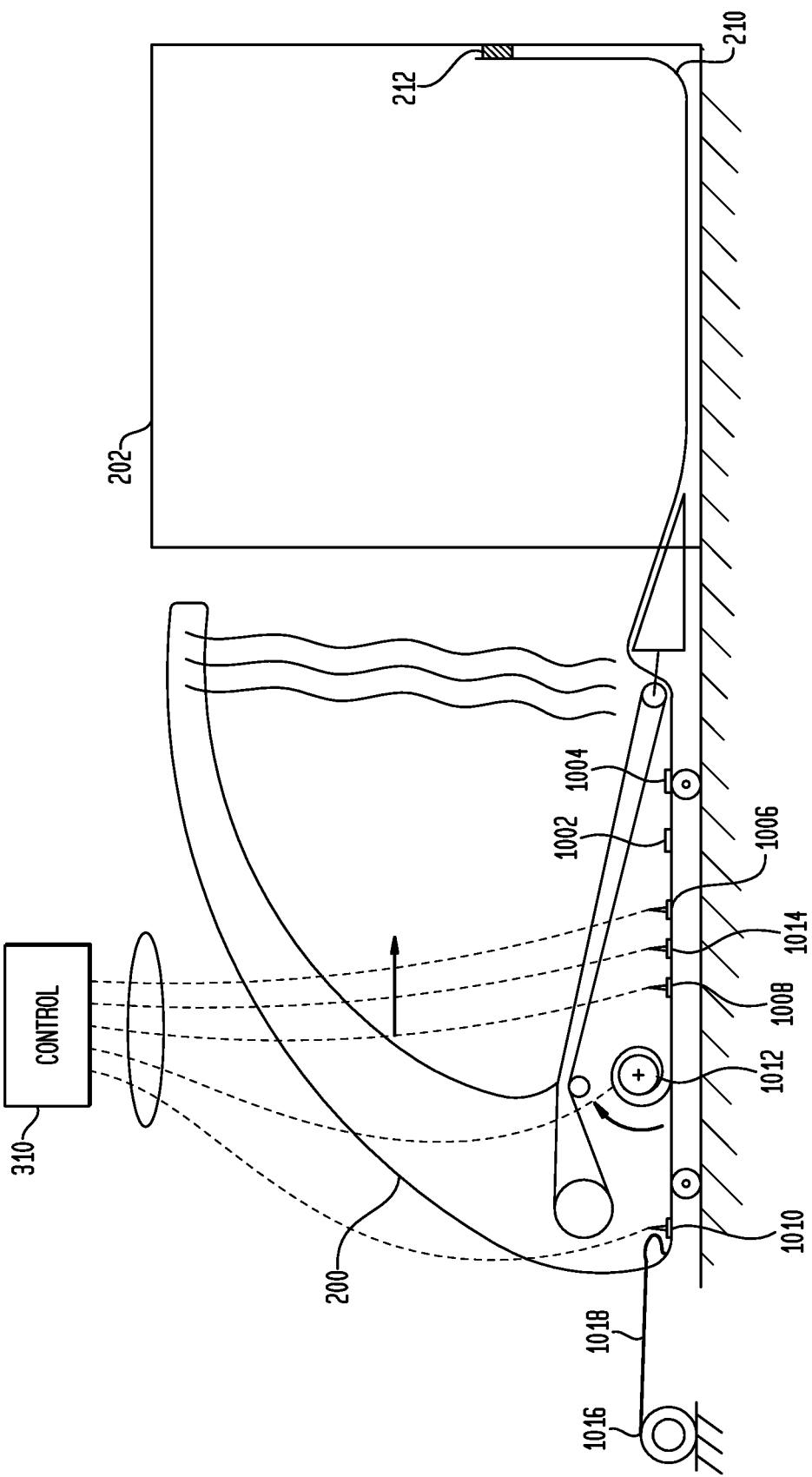

AUTOMATED UNLOADER BASE BELT AND CONTAINER

CROSS-REFERENCE TO RELATED APPLICATIONS

The present application is a continuation-in-part of U.S. patent application Ser. No. 13/091,583, filed Apr. 21, 2011, now U.S. Pat. No. 8,651,794, and is related to, and claims priority to, U.S. Provisional Patent Application No. 61/326,876, filed Apr. 22, 2010, both of which are hereby incorporated by reference into the present application as if fully set forth herein.

TECHNICAL FIELD

The present disclosure is directed, in general, to mail and parcel processing techniques.

BACKGROUND OF THE DISCLOSURE

Improved and more efficient systems for unloading items from a container or trailer are desirable.

SUMMARY OF THE DISCLOSURE

Various disclosed embodiments include a base belt for use with an automated unloading apparatus that can automatically unload a container having a plurality of items located on the base belt and a container configured for use with an automated unloading apparatus. The base belt has a trailer end configured to be removably attached to a container. The base belt has an unloader end configured to be removably attached to the automated unloading apparatus. The container has a container body having an interior and an attachment point on the interior of the container.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 depicts a detail schematic view of a stack control curtain mechanism according to the disclosure;

FIG. 7 depicts a schematic view of a ramping conveyor according to the disclosure;

FIG. 10 depicts an example of control features of an automatic unloader in accordance with disclosed embodiments;

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In an effort to increase load density and reduce transportation cost, the trucking industry may use a practice called "bed-loading". A trailer may be loaded with items of a broad range of sizes, weights, and shapes. Sacks and items having extreme aspect ratios or weights are typically bed-loaded last in a separate area of the trailer or box bed. On a full trailer, such extreme pieces may be located near the trailer door and would be the first items unloaded.

Manually unloading a bed-loaded trailer can be a grueling job that may be performed at extreme temperatures with relatively low pay. A person unloading standard packages with the aid of an extendible conveyor may achieve sustained rates in the range of 1,000 pieces per hour (1K PPH). Sacks and items of irregular size/shape are typically unloaded at rates much less than standard packages. Such reduced rates are often 200-500 PPH, depending on weight, shape, door configuration, and other factors. The time required to load or unload a trailer directly affects dock door utilization/productivity and therefore facility size. Problems have arisen with previous attempts to automated trailer unloading, including solution cost, cube loss, trailer fleet modification, throughput, staffing, package size/type/formats, loading constraints/configuration, package damage, ease of operation/automation, cost to maintain and ease of retrofitting existing loading dock facilities.

Various disclosed embodiments include unloading items from a trailer or other container generally without operator intervention. Depending on the specific implementation, an automatic unloader as described herein can operate in a fully-automatic mode to automatically move into and unload a container or can operating in a semi-automatic mode where an operator is managing the operation of one or more automatic unloaders from a central control or otherwise. A nose ramp of an automated unloading apparatus is moved under a base belt in the trailer and under a first item of a plurality of items in the trailer. As the ramp continues advancing, the item is moved onto a conveyor, which is adapted to carry the item out of the trailer. A stack control curtain maintains the remaining items in a stack or pile during and after removal of the first item. A tensioning mechanism maintains a desired tension on the base belt as the ramp moves under the base belt and the first item.

Figure 1:
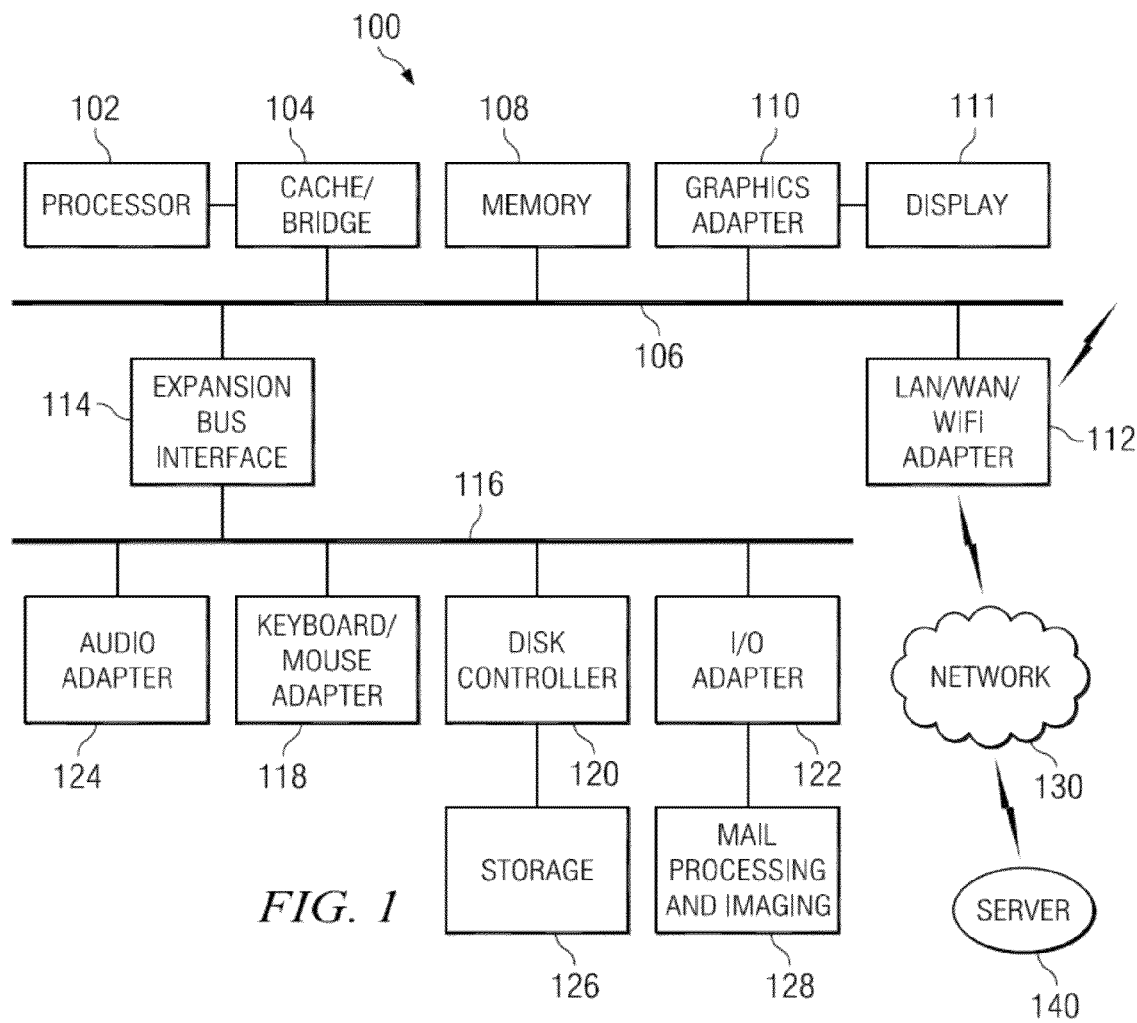
FIG. 1 depicts a block diagram of a data processing system in which an embodiment can be implemented.

FIG. 1 depicts a block diagram of a data processing system 100 in which an embodiment can be implemented, for example, as a control system for a mechanism as described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to mail processing and imaging devices 128, as described herein, to image, scan, transport, label, address process, sort, and otherwise processes the mail pieces in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein, and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing facility.

Figure 2:
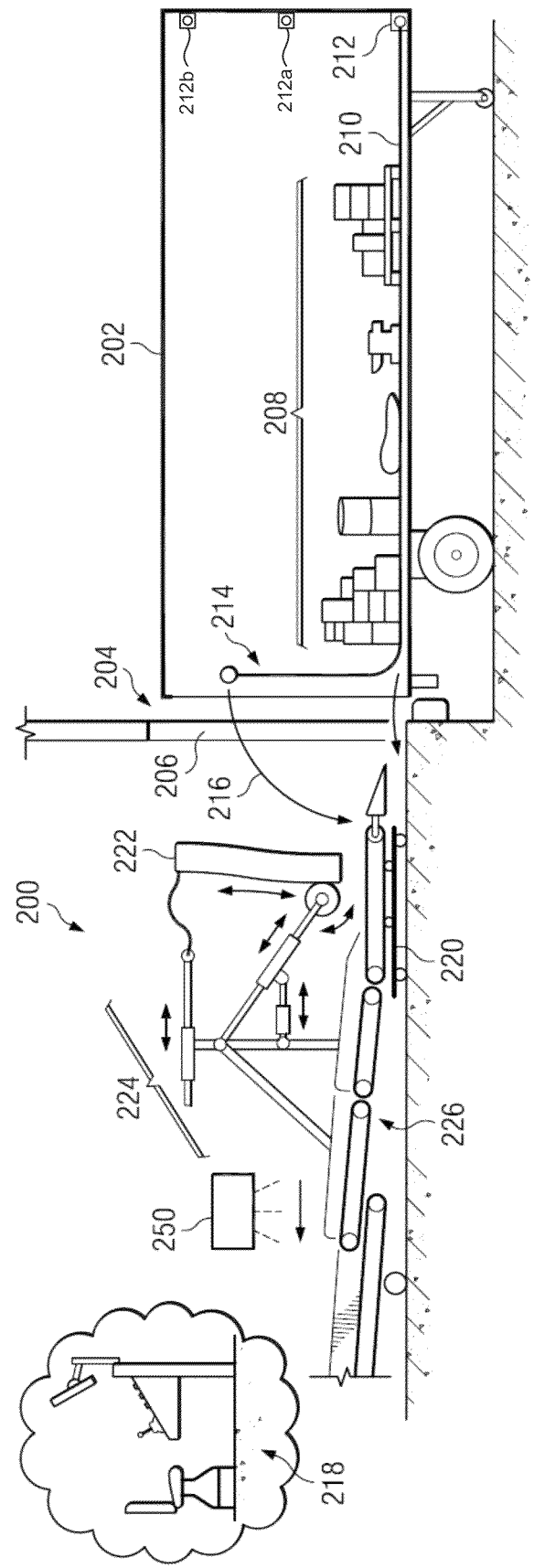
FIG. 2 depicts a schematic view of an automated unloading apparatus according to the disclosure.

FIG. 2 depicts a schematic view of an automatic unloader 200 according to the present disclosure. A trailer 202 is positioned adjacent to a loading dock 204 and a dock door area 206 for unloading. Note that when a "trailer" is referred to herein, the description is also intended to apply to other containers, and "container" is intended to include trailers and other containers that hold items or packages as described herein. Within the trailer 202 are loaded items 208, which are to be unloaded by the automatic unloader 200. The items 208 are positioned on top of a base belt 210, a first end of which is attached to the trailer at an attachment point 212. In this example, attachment point 212 is shown at the base of the back wall of the trailer 202, but attachment point 212 can be located anywhere along the trailer. In specific embodiments, and as described in more detail below, the attachment point 212 is at a high position proximate to the back wall of the trailer 202, for example at a midway height along the back wall (as shown at 212*a*) or near the top of the back wall (as shown at 212*b*). Higher placement of attachment point 212 such as at 212*b* causes the base belt 210 to form a natural ramp as the automatic unloader 200 approaches the rear end of the trailer 202 and the tension on base belt 210 causes the belt to extend between the automatic unloader 200 and the attachment point 212*b*. This natural belt ramp biases the remaining packages to move toward and onto the automatic unloader 200. The attachment of base belt 210 to an attachment point 212 will preferably separate under forces greater than normal operation. This can act as a "mechanical fuse" when the automatic unloader 200 is travelling too far into trailer 202; as the force on the base belt increases (for example as the automatic unloader 200 reaches the back wall of trailer 202, the base belt 210 will detach from the attachment point rather than continuing to attempt to pull automatic unloader 200 into the trailer 202. Base belt 210 can be made of a rubber or other polymer and can be wide enough to substantially cover the width of the floor of trailer 202.

A second end of the base belt 210 (opposite to the first end) may be raised to a first transit position 214 to provide support to stacked items during transit to help prevent stack collapse. The second end of the base belt 210 may alternately be placed in a second transit position (not shown in FIG. 2) on the floor of the trailer 202, where the base belt 210 may be rolled or gathered during transit. From either the first or second transit position, to initiate unloading of the trailer 202, the second end of the base belt 210 is brought generally along the path indicated by the arrow 216 to be attached to the automatic unloader 200, as described in greater detail below.

The first end of the base belt 210, which attaches to the trailer, is also referred to herein as the "trailer end" of the base belt. The second end of the base belt 210, which attaches to the automatic unloader 200, is also referred to herein as the "unloader end" of the base belt. The trailer end of the base belt is configured to be removably attached to the interior of a trailer or container body, as described herein, and the trailer or container is similarly configured to be removably attached to the trailer end of the base belt as described herein.

The trailer end and the unloader end of the base belt can be substantially structurally identical, as described in more detail below, so that the base belt can be installed in either orientation. In such a case, whichever end is attached to the trailer during installation and use is considered the trailer end and the opposite end is considered the unloader end. In other cases, the trailer end and the unloader end of the base belt can be structurally different to accommodate the specific attachment to the trailer and unloader. In such a case, the end configured to be attached to the trailer is considered to be the trailer end, and the end configured to be attached to the unloader is considered to be the unloader end.

The unloader 200 is positioned at the open door of the trailer 202 by an operator at an operator console 218. The operator may use one or more video cameras (not shown in FIG. 2) that is mounted to the unloader 200 or to the loading dock 204 and presents the operator with a view of the unloader 200 and the trailer 202.

In some cases, the unloader includes a positioning mechanism 220, which is remotely operated by the operator to position the unloader 200 at the entrance to the trailer 202. The positioning mechanism 220 may be a motorized caster or other mechanism suitable for positioning the unloader 200 relative to trailer 202 prior to initiating an unloading process or during the unloading process. The positioning mechanism 220 is operable to position the unloader 200 at least along a longitudinal axis of the trailer 202 or horizontally relative to the trailer 202. In some embodiments, the unloader 200 is substantially the same width as the interior of the trailer 202, such that the unloader 200 substantially fills the trailer 202 from one sidewall to the other sidewall. In some embodiments, the unloader 200 is configured to sense the dimensions of the opening and sidewalls of the trailer 202 and to position and guide itself for unloading.

The unloader 200 also includes a stack control curtain 222 mounted to a positioning mechanism 224. The operation of the stack control curtain 222 and the positioning mechanism 224 will be explained in greater detail with reference to FIGS. 5 and 6. Stack control curtain 222 can include one or more "layers" of curtains, and each curtain can be a single curtain or multiple hanging curtain "strips" that together function as described herein.

The unloader 200 is coupled to an extendible conveyor 226, which is operable to carry items unloaded by the unloader 200 from the trailer 202. A sensor 250 may be mounted in a position that enables the sensor 250 to sense items on the unloader 200 or the extendible conveyor 226. The sensor 250 is operable to sense a label, RFID tag, barcode, or other identifying feature of such items.

Figure 3:
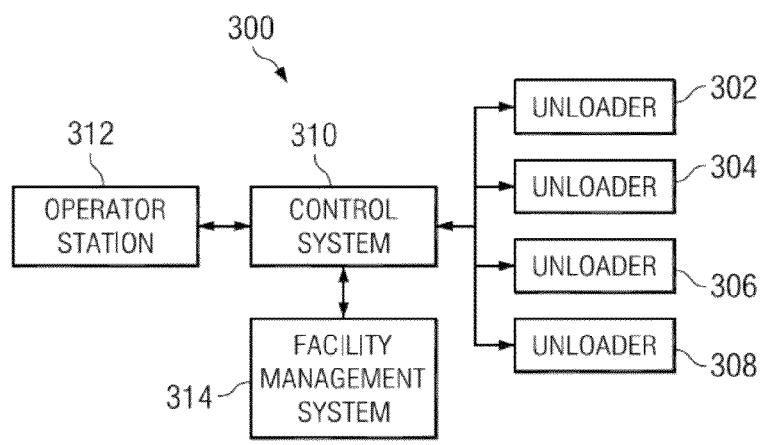
FIG. 3 depicts an automated unloading system according to the disclosure.

FIG. 3 depicts an automated unloading system 300 according to the disclosure. Unloaders 302, 304, 306, and 308 according to the disclosure are controlled by a controller 310. Each of the unloaders 302-308 may be positioned at each of four truck docks and operated to unload four trailers separately or concurrently. An operator may use an operator console 312 to control the unloaders 302-308. The controller 310 may be communicatively coupled to a facility management system 314. The controller 310 may receive address or identification information sensed from items unloaded by one or more of the unloaders 302-308 and send the information to the facility management system 314 (or other external system) for its use in routing the items to desired destinations.

While the operator console 312, the controller 310, and the facility management system 314 are depicted in FIG. 3 as separate elements of the automated unloading system 300, it will be understood that in other embodiments, this functionality of these elements may be provided in one or two elements. In some embodiments, the automated unloading system 300 also includes one or more sensors (not shown in FIG. 3) providing a view of one or more of the unloaders 302-308 and one or more corresponding trailers or other containers. In such embodiments, the controller 310 is further adapted to control an unloader positioning mechanism to position the unloader in a desired position relative to the trailer, prior to initiating an unloading process.

Figure 4:
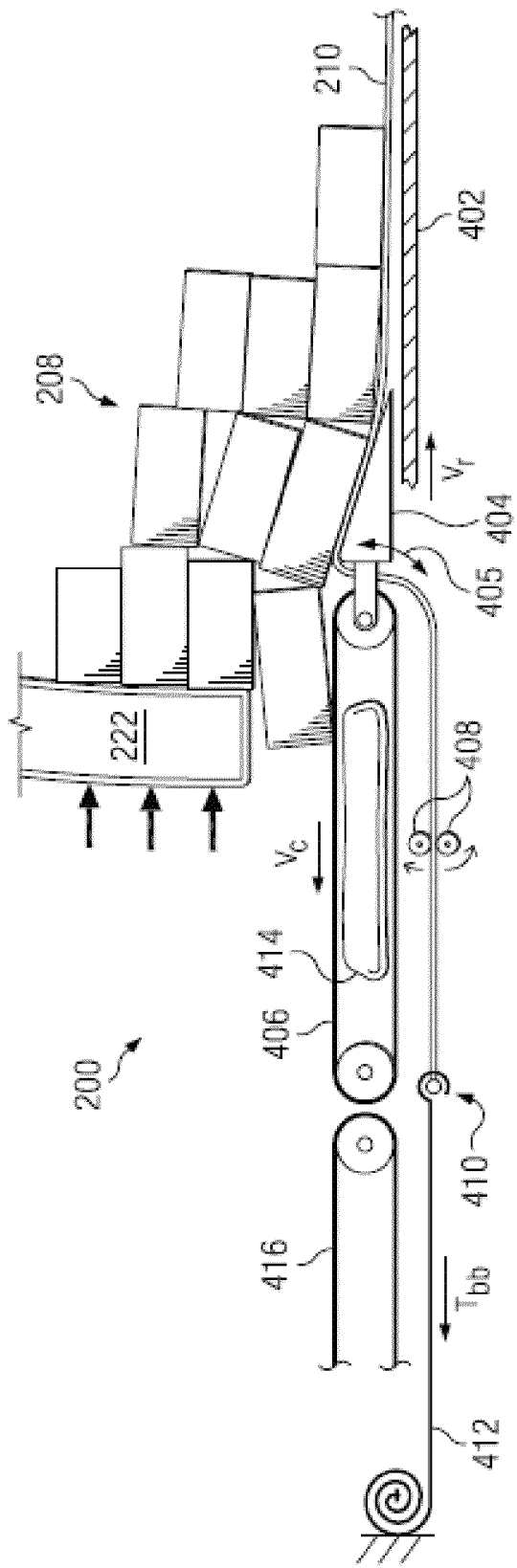
FIG. 4 depicts a schematic detail view of the automated unloading apparatus of FIG. 2.

FIG. 4 depicts a schematic detail view of the automatic unloader system 200. The base belt 210 has been routed over a nose ramp 404, between the nose ramp 404 and a nose conveyor 406, through pinch rollers 408, and coupled at coupling 410 to a tensioning roller 412. The pinch rollers 408 and the tensioning roller 412 comprise a tensioning mechanism for the base belt 210. The nose ramp 405 may pivot about a horizontal axis, as indicated by arrow 405. The tensioning roller 412 maintains a desired tension $T_{bb}$ on the base belt 210 via the coupling 410. The unloader 200 moves itself forward under the base belt 210 and loaded items 208 by using the pinch rollers 408 to pull on the base belt 210. In other embodiments, the unloader 200 moves itself forward using the positioning mechanism 220 and the tensioning roller 412 operates to maintain the base belt 210 taut over the nose ramp 404. The tensioning roller 412 is mounted in a fixed position relative to the loading dock 204, in order to maintain the tension $T_{bb}$ on the base belt 210 regardless of movement of the unloader 200. In some embodiments, the tension on the base belt 210 caused by pinch rollers 408, tensioning roller 412, or other tensioning means is used as the driving force to pull the automatic unloader system 200 into the container to unload the items 208.

The unloader 200 moves into the trailer along the trailer floor 402, sliding the nose ramp 404 under a rearmost item of the items 208. By sliding the nose ramp 404 under an item while the item remains on the base belt 210, the unloader 200 reduces the possibility of the nose ramp 404 pushing the item into the trailer, rather than sliding it up onto the nose conveyor 406. When moving forward, in some cases, the unloader 200 moves at a speed $V_r$ that substantially matches a speed $V_c$ of a transport belt of the nose conveyor 406. In this way, the items 208 are transferred with substantially no relative motion from the base belt 210 to the nose conveyor 406. Of course, in other cases, $V_r$ may be different from $V_c$, so long as the items 208 are effectively and efficiently moved from the base belt 210 to the nose conveyor 406.

Once on the nose conveyor 406, a lowest, rearmost item of the items 208 is carried under the stack curtain 222 out of the trailer 202 along the nose conveyor 406, onto the takeaway conveyor 416, toward the extendible conveyor 226. An upper portion of the transport belt of the nose conveyor 406 may be supported by a cushion 414, to reduce impact forces on items that fall onto the nose conveyor from the items 208.

As will be described in greater detail below, the stack curtain 222 may be moved toward and away from the items 208 in order to break the lowest, rearmost item free of any item resting upon it, to enable the item to be carried away by the nose conveyor 406. The stack curtain 222 may be moved to a higher position above the nose conveyor 406, to permit a larger item to pass under the stack curtain 222. The stack curtain 222 may be positioned rearward along the nose conveyor, farther from the nose ramp 404, in order to expose a larger portion of the nose conveyor 406, to permit a larger item to rest entirely upon the nose conveyor 406 and be carried away. The unloader 200 is operable to remove a diversity of items 208 (e.g., packages, irregular shapes/weights, sacks, containers, rolling stock, pallets, etc.) from the trailer 202 or other container, whether the items 208 are arranged in orderly, segregated stacks or intermingled in disordered piles.

Figure 5:
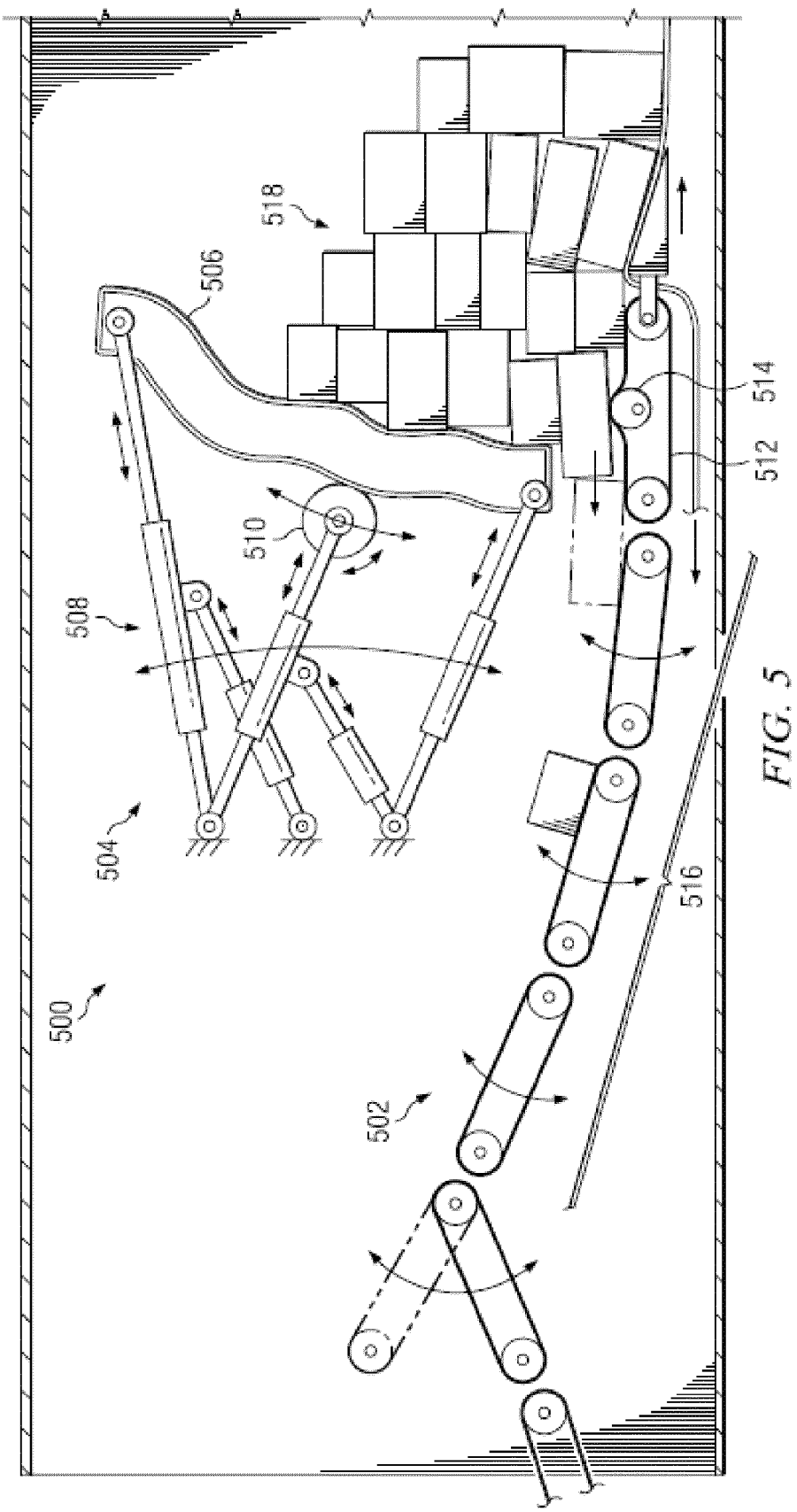
FIG. 5 depicts a schematic view of a second automated unloading apparatus according to the disclosure.

FIG. 5 depicts a schematic view of another automatic unloader 500 according to the present disclosure. The unloader 500 includes a segmented drive ramp 502 and a stack control curtain mechanism 504. The stack control curtain mechanism 504 includes a cushioned stack control curtain 506 and one or more actuators 508 adapted to change a configuration of the stack control curtain 506 relative to items 518. The actuators are operable to independently move the top and bottom of the stack control curtain 506 toward and away from the nose of the trailer 202, as well as to vary a contour of the stack control curtain 506 using a roller 510 or other suitable actuator.

The segmented drive ramp 502 includes a nose conveyor 512 and ramping conveyor segments 516. The nose conveyor 512 has a cam roller 514, which rotates on a longitudinal axis that is not coincident with a geometric longitudinal axis of the roller 514. As the cam roller 514 rotates, it raises and lowers an upper portion of a transport belt of the nose conveyor 512. The cam roller 514 operates to jostle or otherwise disturb the items 518 positioned on the nose conveyor 512, to facilitate removal of a lowest item by the nose conveyor 512. The cushioned stack control curtain 506, the nose conveyor 512, and the ramping conveyor segments 516 manage stack decomposition and reduce free fall distance and impact force for the items 518.

A ramping angle and terracing effect may be created by the ramping conveyor segments 516. As the segmented drive ramp 502 advances deeper into the stack, the ramping conveyor segments 516 may be raised and controlled relative to raising the stack control curtain mechanism 504 to allow package flow between the surface of the segmented drive ramp 502 and the bottom edge of the cushioned stack control curtain 506. As the segmented drive ramp 502 advances into the stack, items are removed at higher and higher levels. The conveyor segments 516 turn on and off to reduce forces between packages and to cancel relative motion between conveyor and package until drive forces are needed The cam roller 514 is mounted below an upper portion of a transport belt of the nose conveyor 512. Cam rollers may also be mounted below upper portions of one or more of the conveyor segments 516 to aid package flow. Pressure and coverage applied by the stack control curtain 506 to the stack is kept within an acceptable range by the actuators 508 to avoid package free fall while not inducing excessive forces or forces that might damage the items 518. A variety of devices known in the art can sense and signal pressure levels. Pressures applied over a small area or at a single point are avoided by making the stack control curtain 506 from a thick cushioned and/or compliant material, such as laminated foam rubber.

FIG. 6 depicts a detail schematic view of the stack control curtain mechanism 504 according to the disclosure. The stack control curtain 506 is moved into a desired configuration by the actuators 508. As individual items are removed from the bottom of the stack or pile of items 518, an internal void 602 may be created within the stack. Where the items are in an otherwise orderly stack or array, such a void may allow an item 604 to drop into the internal void, possibly damaging the item 604 or an item on which it lands, or creating a jam that prevents subsequent items 518 from being removed from the trailer 202. Internal voids may create similar unloading problems as unordered piles of items 518. Under control of the actuators 508, the stack control curtain 506 is adapted to change configuration to prevent formation of internal voids in the stack or pile of items 518.

FIG. 7 depicts a schematic view of a ramping conveyor 700 according to the present disclosure. The ramping conveyor 700 includes a nose conveyor 702 and a variable incline angle conveyor 704. The ramping conveyor 700 supports items on conveyor belts, rather than on underlying solid support structures. The nose conveyor 702 includes a cushioned cam roller 706 that raises and lowers an upper portion of the nose conveyor 702, to break items loose from a stack or pile of items. A stack control curtain 708 restrains upper items of the stack or pile and allows single items to pass from the nose conveyor 702 to the variable incline angle conveyor 704. As may be seen by comparing depicted positions of the stack control curtains 222, 506 and 708 in FIGS. 2, 4, 5, and 7, a stack control curtain according to the disclosure may be moved to multiple desired positions above a nose conveyor and other conveyor segments of unloaders according to the disclosure.

The variable incline angle conveyor 704 may include raised cleats 710 to prevent items on the conveyor 704 from slipping back toward the trailer as an angle from the horizontal of the conveyor 704 is increased. The conveyor 704 may include a cushioned cam roller 712 to control clumping and spacing of items on the conveyor 704. The conveyor 704 includes a roller 714 that may be raised and lowered to vary an angle from the horizontal of an upper portion of the variable incline angle conveyor 704. The suspended belt of the conveyor 704 provides a forgiving surface for items that it transports, to reduce damage to the items. Similar results may be obtained through the use of foam cushions or air bladders beneath the upper portion of the conveyor 704.

The conveyor 704 is generally inclined to cause layers of tall stacks of items to decompose due to gravity. This thinning of layers provides natural metering of package flow for easier hand off from discharge of the conveyor 704 to generally narrower downstream takeaway conveyors. At an opposite end of the conveyor 704 from the nose conveyor 702, the angle is selectively changed to produce a wedge-like engagement of the nose conveyor 702 with items of the stack to facilitate stack decomposition and removal. Similar comments apply to the ramping segmented drive ramp 502 of the unloader 500 depicted in FIG. 5.

Figure 8:
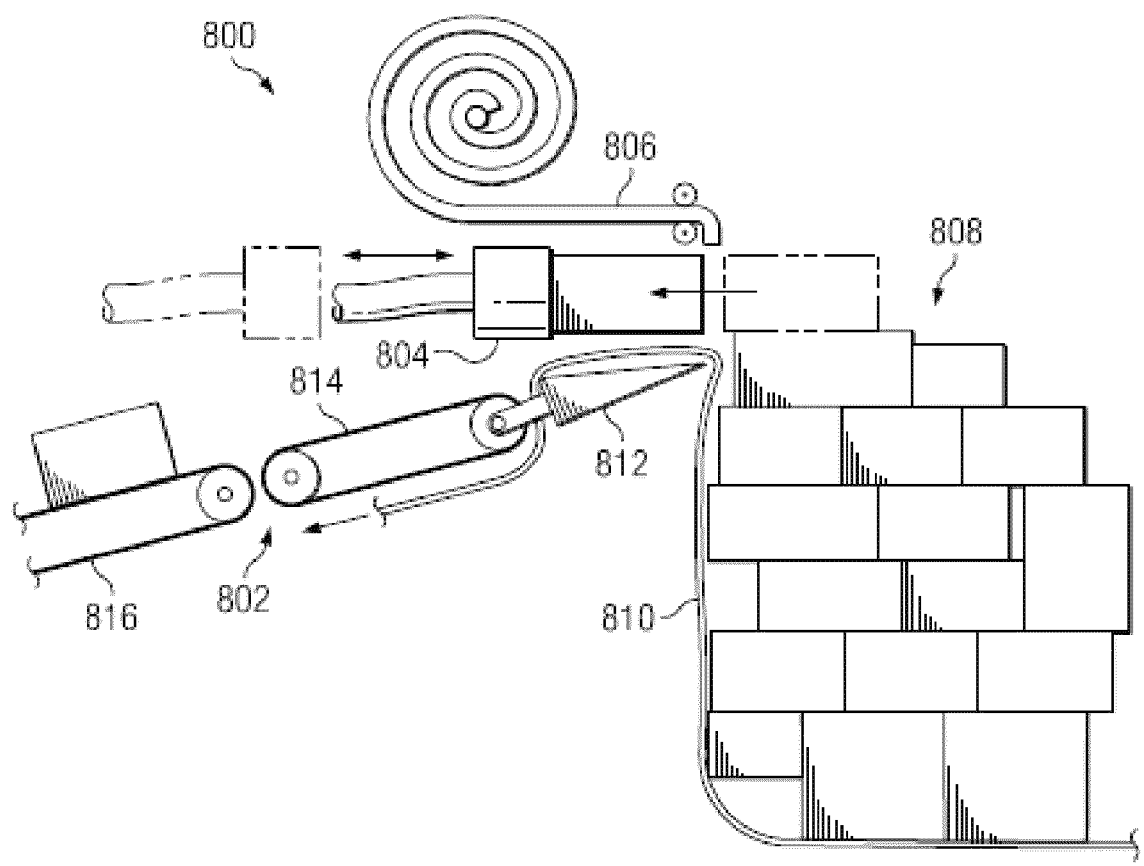
FIG. 8 depicts a schematic view of another automated unloading apparatus according to the disclosure.

FIG. 8 depicts a schematic view of another automatic unloader 800 according to the present disclosure. The unloader 800 includes a conveyor mechanism 802, an item removal mechanism 804, an upper stack control curtain 806, and a lower stack control curtain 810. The unloader 800 unloads items 808 from an upper portion of a stack or pile. The upper portion may be a top, or near the top, of the stack. The lower stack control curtain 810 passes over a nose ramp 812, and is placed under tension to control a lower portion of the stack of items 808. The item removal mechanism 804 pulls individual items from the top of the stack of items 808 over the nose ramp 812 and onto a nose conveyor 814, which transports the items to a take-away conveyor 816. The item removal mechanism 804 may be a vacuum head, a magnetic head, a hook, or other suitable mechanism for mechanically coupling to an item and pulling the item onto the nose conveyor 814. The relative positions of the item removal mechanism 804 and the nose ramp 812 manages stack decomposition and minimizes free fall distance and resulting impact force. As the top of the stack of items 808 is cleared the conveyor mechanism 802 is lowered down the face of the stack. The lower stack control curtain 810 is kept taut to continue controlling the lower portion of the stack of items 808. The item removal mechanism 804 is mechanically coupled to, and moves with, the conveyor mechanism 802, as the conveyor mechanism 802 moves vertically along the stack of items 808 and horizontally into the trailer (or other container).

As the conveyor mechanism 802 is lowered down the face of the stack, the upper stack control curtain 806 is extended downward to further control the stack of items 808 by forming a barrier against items falling from the stack onto the nose ramp 812. The upper stack control curtain 806 may be positioned farther forward than the lower stack control curtain 810, to be positioned adjacent to, and control, a remaining upper portion of the stack of items 808. When the conveyor mechanism 802 reaches the bottom of the stack of items 808, the conveyor mechanism 802 advances to a face of the remaining portion of the stack of items 808. The conveyor mechanism 802 is raised to the top, or near the top, of the stack and unloading by the item removal mechanism 804 resumes. As the conveyor mechanism 802 is raised, the lower stack control curtain 810 is extended to control the lower portion of the stack, and the upper stack control curtain 806 is retracted.

Figure 9:
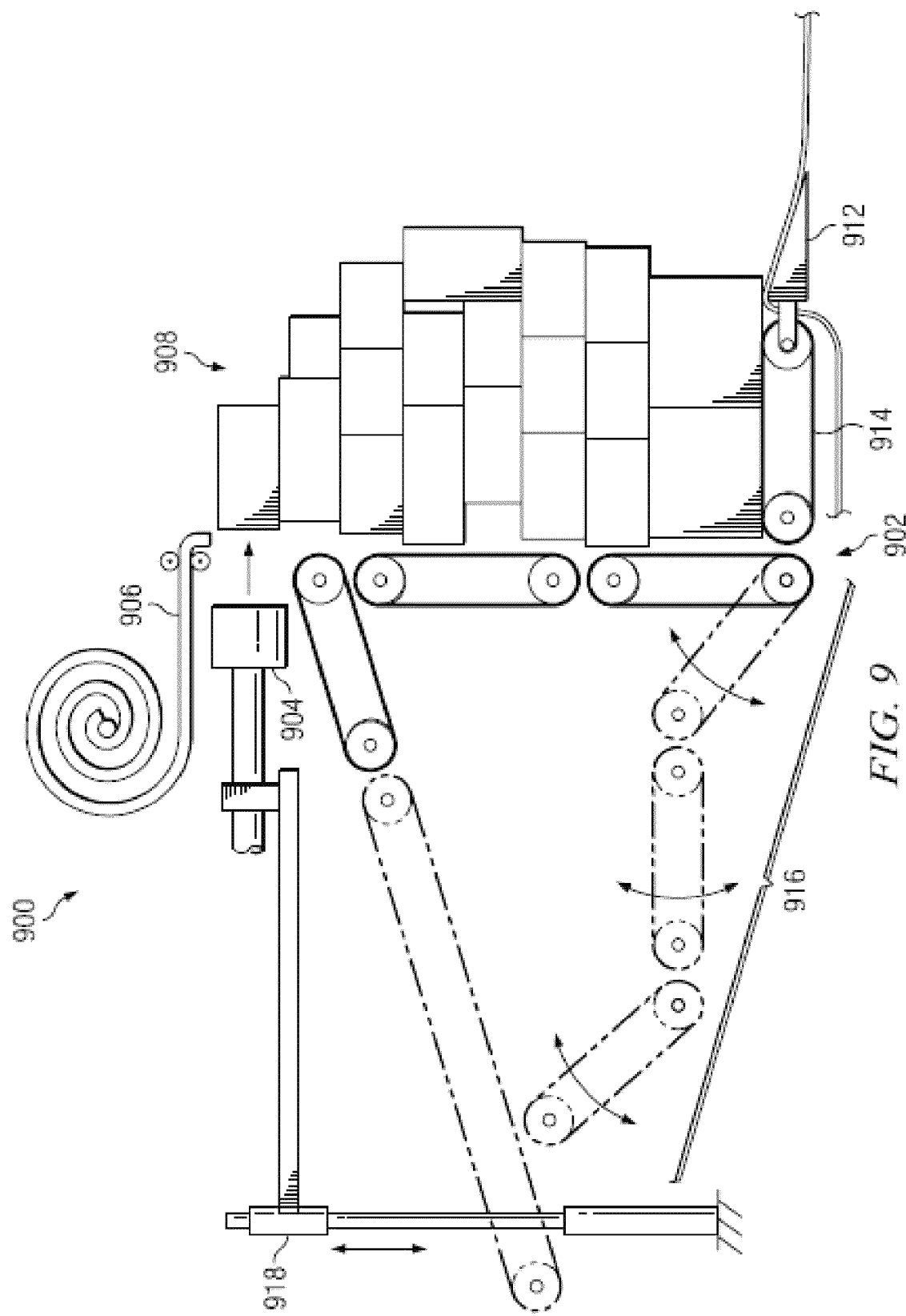
FIG. 9 depicts a schematic view of still another automated unloading apparatus according to the present disclosure.

FIG. 9 depicts a schematic view of another automatic unloader 900 according to the present disclosure. The unloader 900 includes a conveyor mechanism 902, a vacuum head 904, and an upper stack control curtain 906. The conveyor mechanism 902 includes a nose ramp 912, a nose conveyor 914 and a segmented take-away conveyor 916. The nose conveyor 914 and/or some or all segments of the segmented take-away conveyor 916 may be cushioned, as described with reference to nose conveyor 406 shown in FIG. 4. The unloader 900 unloads items 908 from an upper portion of a stack or pile. The upper portion may be a top, or near the top, of the stack. Segments of the segmented take-away conveyor 916 are initially raised to a substantially vertical configuration to control a lower portion of the stack of items 908.

The vacuum head 904 pulls individual items from the top of the stack of items 908 onto a currently uppermost segment of the segmented take-away conveyor 916. The relative positions of the vacuum head 904 and the currently uppermost segment of the segmented take-away conveyor 916 manages stack decomposition and minimizes free fall distance and resulting impact force. As the top of the stack of items 908 is cleared segments of the segmented take-away conveyor 916 are repositioned to reduce the height of the segmented take-away conveyor 916 along the face of the stack. The remaining substantially vertical elements of the segmented take-away conveyor 916 control the lower portion of the stack of items 908. The vacuum head 904 is mechanically coupled to, and moves with, the conveyor mechanism 902, as the conveyor mechanism 902 moves horizontally into the trailer (or other container). The vacuum head 904 is coupled to the conveyor mechanism 902 by a linkage 918 that is operable to raise and lower the vacuum head 904.

As the segments of the segmented take-away conveyor 916 are repositioned to reduce the height of the segmented take-away conveyor 916 along the face of the stack, the upper stack control curtain 906 is extended downward to further control the stack of items 908 by forming a barrier against items falling from the stack onto the segmented take-away conveyor 916. The upper stack control curtain 906 may be positioned farther forward than the substantially vertical elements of the segmented take-away conveyor 916, to be positioned adjacent to, and control, a remaining upper portion of the stack of items 908. When the vacuum head 904 reaches the bottom of the stack of items 908, the conveyor mechanism 902 advances to a face of the remaining portion of the stack of items 908. The vacuum head 904 is raised to the top, or near the top, of the stack and unloading by the vacuum head 904 resumes. As the vacuum head 904 is raised, segments of the segmented take-away conveyor 916 are returned to a substantially vertical configuration to control a lower portion of the stack of items 908, and the upper stack control curtain 906 is retracted.

FIG. 10 depicts an example of control features of an automatic unloader in accordance with disclosed embodiments. This example and the features shown here can be used in any of the embodiments discussed above and with other combinations of disclosed feature, though reference numbers as in FIG. 2 are used here in particular.

Shown here are automatic unloader 200, trailer 202, and base belt 210. Base belt 210 is removably attached to trailer 202 at attachment point 212. Control system 310 is connected to control automatic unloader 200 as described herein, and is connected to various sensors that detect the state of automatic unloader 200 and base belt 210.

Base belt 210 can have one or more features that interact with the sensors and control system 310. For example, base belt 210 can have a belt identification tag 1002 that includes visible or machine-readable indicia that can identify the model or serial number of base belt 210, the manufacture or install date of the base belt 210, or other identifier that can be used by operators or control system 310 to identify the base belt 210 and its characteristics. Base belt 210 can also have one or more end-of-travel tags 1004 that include visible or machine-readable indicia that indicate the relative placement of the respective end-of-travel tags 1004 with respect to the trailer end of the base belt 210 or attachment point 212. Each of these tags can be attached to or integral with the base belt 210. Each of these tags can include, for example, a human-readable indicia or a machine-readable indicia including bar codes, QR codes, RFID tags, simple marks or marking patterns on the base belt 210, or otherwise, as long as they can function as described herein. Each of the tags described herein can be individual tags or can be "combination" tags that act as different or multiple tags described herein.

The sensors of automatic unloader 200 can include a belt identification reader/sensor 1006 that can read the belt identification tag 1002. By using belt identification reader/sensor 1006 to read the belt identification tag 1002, control system 310 can identify base belt 210 and its characteristics. By using belt identification reader/sensor 1006 to read the belt identification tag 1002, control system 310 can collect location and frequency-of-usage data for base belt 210, and other data, which can be used to predict end-of-life, replacement times, possible failure, and other information with regard to base belt 210.

The sensors of automatic unloader 200 can include an end-of-travel sensor 1006 that can read the end-of-travel tags 1004. By using end-of-travel sensor 1006 to read the end-of-travel tags 1004, control system 310 can determine the relative location of automatic unloader 200 with respect to the trailer end of the base belt 210 or attachment point 212.

The sensors of automatic unloader 200 can include a belt travel sensor/encoder 1008 that measures the travel of automatic unloader 200 along the base belt 210. Control system 310 can use this information to determine the placement of automatic unloader 200 with respect to trailer 202.

The sensors of automatic unloader 200 can include a floor travel sensor/encoder 1010 that measures the travel of automatic unloader 200 along the floor of trailer 202. Control system 310 can use this information to determine the placement of automatic unloader 200 with respect to trailer 202.

The sensors of automatic unloader 200 can include an end of travel sensor 1014 that detect when automatic unloader 200 has reached the end of travel along the floor of trailer 202. Control system 310 can use this information to determine that automatic unloader 200 should stop its motion into trailer 202.

In this example, motor 1012 can be used as a tensioning mechanism as described herein, such as pinch rollers 408 and the tensioning roller 412 or otherwise, and can be connected to the unloader end of base belt 210 and used to pull automatic unloader 200 into trailer 202 during unload. A retract motor 1016, which can be mounted on a fixed point, can connect with automatic unloader 200 via a retract belt 1018 (or cable, rope, chain, etc.) to pull automatic unloader 200 out of trailer 202 when unload is complete or when the automatic unloader 200 otherwise should be retracted.

Various embodiments can include other similar sensors on other elements of the automatic unloader 200, such as incline, angle, or positioning sensors on any component of the automatic unloader 200, speed sensors on any component of the automatic unloader 200, including sensors that can verify the speed and operation of any conveyor portion, cameras, proximity or pressure sensors, breakdown or stall sensors, or any other sensors known to those of skill in the art that can detect the condition, state, or operation of the automatic unloader 200 or its contents.

In various embodiments, automatic unloader 200 can also include flow density sensors that can be used by control system 310 when automatic unloader 200 is operating in a fully-automatic mode without operator intervention. In other cases, with or without density sensors, the automatic unloader 200 can operate in a semi-automatic mode where an operator can observe and control flow and movement using, for example, cameras, a viewing screen, or light indicators mounted at the operator control panel or flashed on an operator display.

Controlling speed, stop, and dwell relative to measuring or observing control flow density improves the unload process especially package flow rate and delayering.

Using the sensors described above, the control system 310 or an operator can examine the relative movement of the trailer floor with respect to the base belt 210. This data, and other sensor data, enables the automatic unloader 200 or operator to determine or control such factors as a direct measure of the automatic unloader speed, a direct measure of the base belt speed (for example to control relative motion of base belt to incline), a direct measure of the incline belt speed, a belt reversing movement of the base belt at empty to estimate slack geometry (helps with kick plate), end of travel sensing, base belt identification which identifies the base belt 210 to confirm that the base belt came from an approved source with known geometry (length or width), features and safety features such as end of travel stop point, and anticipated end of travel tag from knowing the base belt length.

Base belt 210 is configured to be removably attached at the trailer end to an attachment point 212 in the trailer and to be removably attached at the unloader end to automatic unloader 200.

FIGS. 11A-11D illustrate various attachment configurations of a base belt in accordance with disclosed embodiments. As described above, each of these attachment configurations can be used at either the trailer end of base belt 210 or at the unloader end of the base belt 210. The trailer end and the unloader end can have the same configuration or can have different configurations. The examples below refer to the "end" of the base belt; this end can be either end of base belt 210 as described above. Similarly, the examples below refer to an "attachment;" this attachment can be either the attachment to the automatic unloader 200 or the attachment to the trailer 202 unless specifically described otherwise. Where the attachment is to the trailer 202, it can be attached, for example, to the rear wall of the trailer 202, the floor of the trailer 202, the ceiling of the trailer 202, to a rod or bar in trailer 202, or any other attachment point 212 of trailer 202.

Figure 11A:
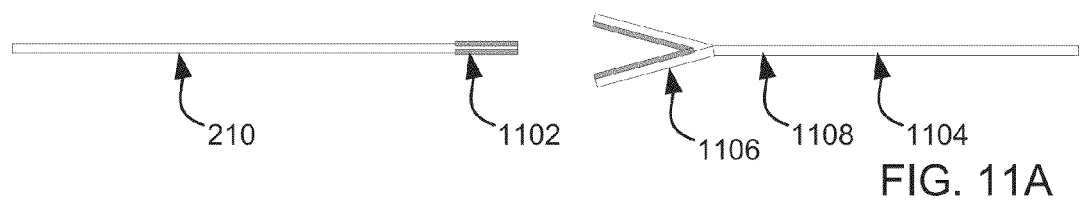
FIGS. 11A-11D illustrate various attachment configurations of a base belt in accordance with disclosed embodiments.

FIG. 11A illustrates a hook-and-loop attachment configuration. Base belt 210 (shown in side view) is configured with a hook-and-loop portion 1102. Hook-and-loop portion 1102 preferably has hook-and-loop material on both upper and lower sides of base belt 210 (either "hook" material or "loop" material), but of course could have the hook-and-loop material on only one side in some cases.

Attachment 1104 includes a belt (or strap) portion 1108 and a hook-and-loop portion 1106. Hook-and-loop portion 1106 is preferably divided into two parts, as illustrated, with hook-and-loop material on the "interior" sides of the two parts. The hook-and-loop material of hook-and-loop portion 1106 is the opposite type (hook or loop) as the hook-and-loop material of hook-and-loop portion 1102 of base belt 210. When attached, hook-and-loop portion 1106 securely and removeably engages hook-and-loop portion 1102 to attach base belt 210 to attachment 1104. In this way, base belt 210 is securely and removably attached to attachment 1104.

Figure 11B:
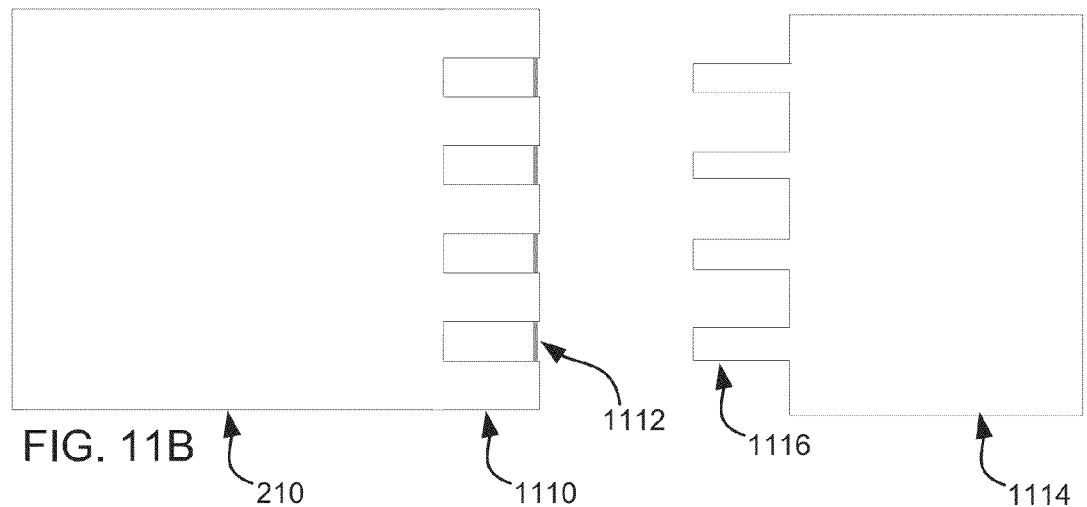

FIG. 11B illustrates a rod-and-strap attachment configuration. Base belt 210 (shown in top view) includes a plurality of rod-retention members 1110. Rod-retention members 1110 securely retain a rod 1112 that extends substantially the width of base belt 210. Base belt 210, in this configuration, is attached to the attachment 1114 via rod 1112.

Attachment 1114 includes a plurality of straps 1116. Straps 1116 are configured to pass between rod-retention members 1110 and around rod 1112 and then to removably attach back to themselves or to attachment 1114. Straps 1116 can use, for example, hook-and-loop fasteners or otherwise to attach back to themselves after being passed around rod 1112. In this way, base belt 210 is securely and removably attached to attachment 1114.

In specific embodiments, attachment 114 includes only the straps 1116, which are not only wrapped around rod 1112, but are also wrapped around a rod on the automatic unloader 200 or the trailer 202. For example, many existing trailers include one or more rods extending across the width of the trailer at or near the rear wall of the trailer. By wrapping straps 1116 around both the rod 1112 of base belt 210 and the trailer rod, base belt 210 is securely and removably attached to the trailer 202, where the trailer rod acts as the attachment point 212.

Figure 11C:
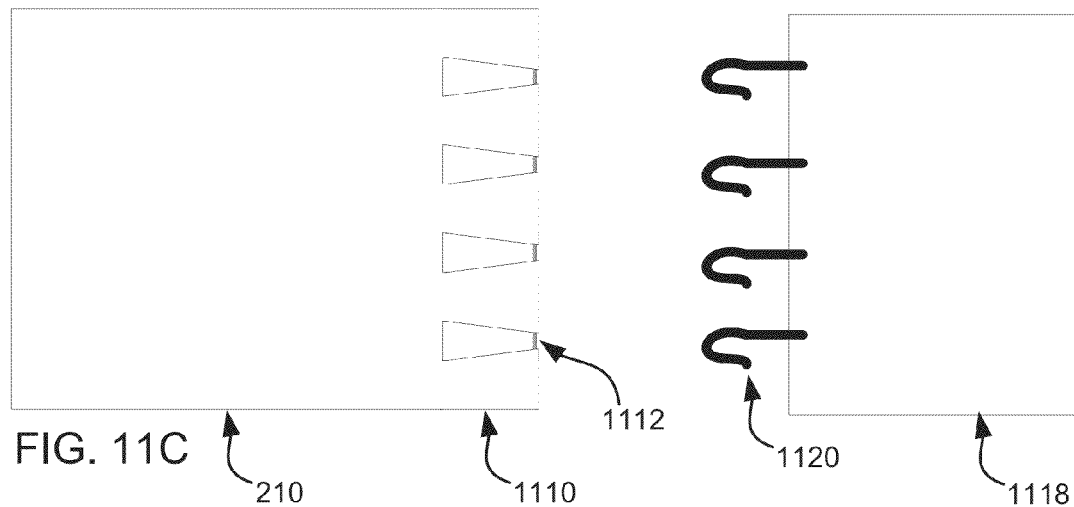

FIG. 11C illustrates a rod-and-snare attachment configuration. In this example, base belt 210 is substantially configured as in the rod-and-strap attachment configuration, but is configured to engage a snare as described below. Base belt 210 (shown in top view) includes a plurality of rod-retention members 1110. Rod-retention members 1110 securely retain a rod 1112 that extends substantially the width of base belt 210. Base belt 210, in this configuration, is attached to the attachment 1114 via rod 1112. In such configurations, the rod-and-strap attachment configuration can also describe the rod-and-snare attachment configuration when only base belt 210 is considered.

Note that in this example, rod retention members 1110 form a tapering opening as they approach rod 1112. This tapered opening can aid in self-aligning the base belt 210 to the attachment 1118 as it is "snared". This tapered configuration can be used in the rod-and-strap attachment configuration as well.

Attachment 1118 includes one or more snares 1120. Snares 1120 are hook-shaped members that are configured to hook around rod 1112. Snares 1120 can include a retention mechanism such as sprung gate to keep the snares 1120 from unhooking from rod 1112. In this way, base belt 210 is securely and removably attached to attachment 1118.

Figure 11D:
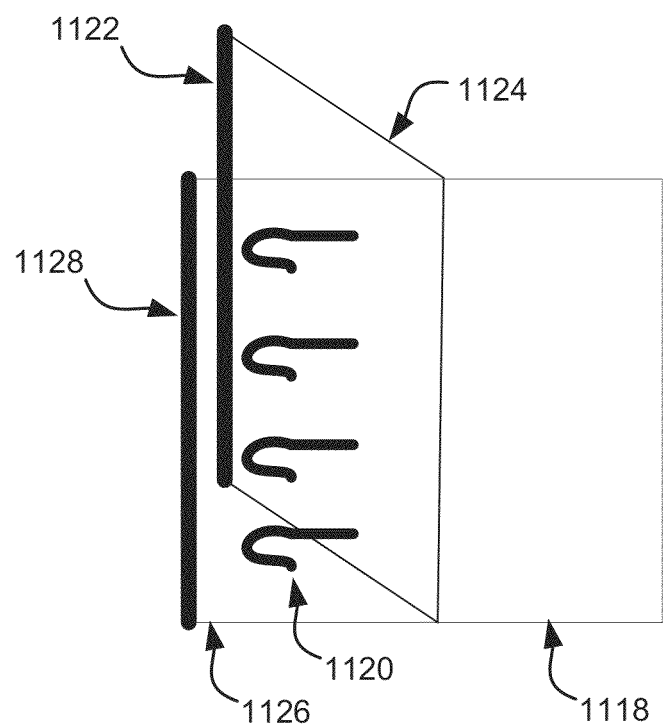

FIG. 11D illustrates an alternate embodiment of attachment 1118 that includes one or more snares 1120. In this example, attachment 1118 also includes upper flap 1122 having an upper magnetic strip 1224 and lower flap 1126 having a lower magnetic strip 1128. In this case, snares 1120 can be attached to either the upper flap 1122 or the lower flap 1126, but are preferably attached to upper flap 1122 to more efficiently "snare" the rod 1112 of base belt 210. When the base belt 210 is being snared, upper magnetic strip 1224 can engage lower magnetic strip 1128 on either side of base belt 210 to aid in the snaring process. After attachment 1118 has snared base belt 210, upper magnetic strip 1224 can engage lower magnetic strip 1128 on either side of base belt 210 to hold upper flap 1122 and lower flap 1126 shut around base belt 210. This prevents snares 1120 from hooking or snagging on the automatic unloader, the container, or other objects.

As described above, each of these configurations can be used at either or both ends of base belt 210. Since the base belt configuration can be relatively the same for both the rod-and-snare attachment configuration and the rod-and-strap attachment configuration, it can be used in the same way with both types of attachments. In other embodiments, the two ends of base belt 210 use different configurations to properly attach to the automatic unloader and the container. Of course, any of the configurations above can reverse the structure of what is part of the attachment and what is part of the base belt. That is, for example, the base belt 210 could have the two-part hook-and-loop portion as shown at 1106, while the attachment has the top-and-bottom hook-and-loop portion as shown at 1102.

Further, in other cases, these attachment configurations can be combined. For example, each of the rod-retention members 1110 can include a hook-and-loop portion 1102 on either or both of the upper and lower surfaces of the rod-retention members 1110. In such a case, the base belt could be used interchangeably in all of the attachment configurations described above.

Figure 12:
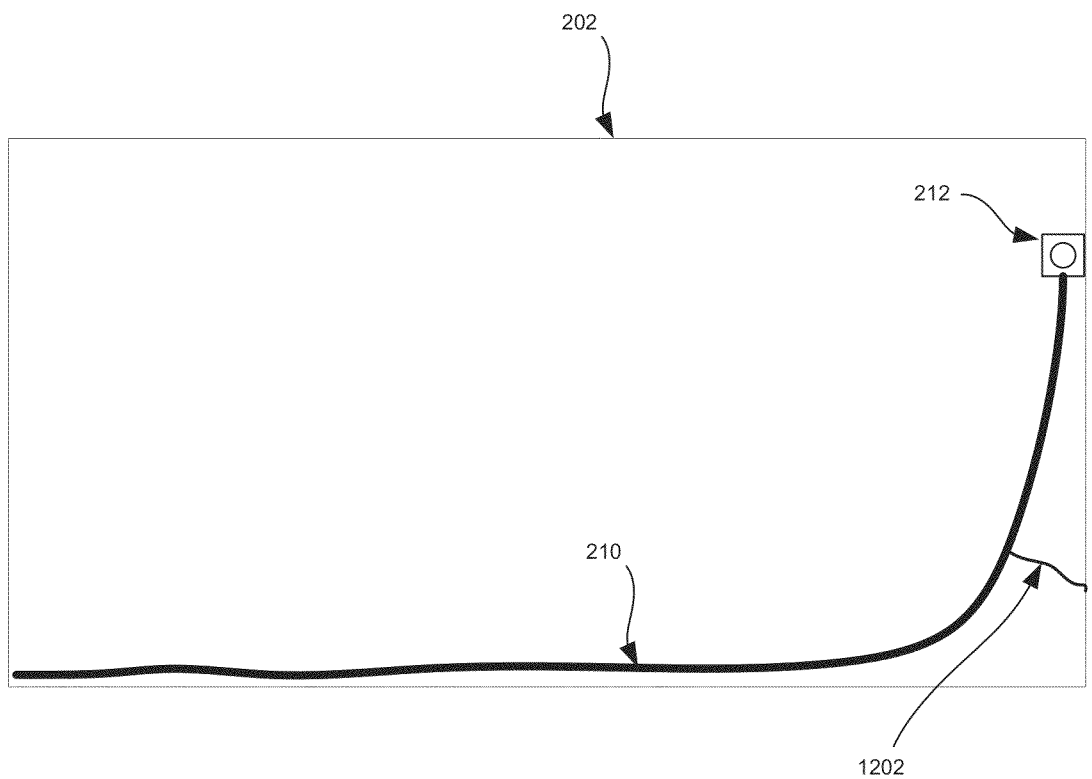
FIG. 12 illustrates a base belt retention configuration in accordance with disclosed embodiments.

FIG. 12 illustrates a base belt retention configuration in accordance with disclosed embodiments. In this example, base belt 210 is attached to trailer 202 at a relatively high attachment point 212. To make loading more efficient, base belt 210 can be configured to be attached to a positioning member 1202 that holds the base belt 210 in place along the rear wall of the trailer, instead of angling too far out into the trailer interior. Positioning member 1202 can be implemented in a number of ways. For example, positioning member 1202 can be an elastic rope, cable, or other element that connects base belt 210 and the rear wall or floor of the trailer 202. As another example, positioning member 1202 can be a hook-and-loop fastener that connects base belt 210 and the rear wall or floor of the trailer 202. Preferably, positioning member 1202 can tear away, disconnect, or stretch as the automatic unloader approaches the rear of the trailer so that base belt 210 can form the natural ramp as described above.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A base belt for use with an automated unloading apparatus that can automatically unload a container having a plurality of items located on the base belt, the base belt comprising:

a trailer end configured to be removably attached to a container so that the trailer end remains attached to the container as the automated unloading apparatus travels along the base belt into the interior of the container;

an unloader end configured to be routed over a nose ramp of the automated unloading apparatus and removably attached to the automated unloading apparatus; and a machine-readable belt identification tag that includes machine-readable indicia that identifies a serial number of the base belt, wherein at least one of the trailer end and the unloader end is structured in a rod-and-strap attachment configuration that includes a plurality of rod-retention members that securely retain a rod that extends substantially the width of base belt.

2. The base belt of claim 1, wherein at least one of the trailer end and the unloader end is structured in a hook-and-loop attachment configuration.

3. The base belt of claim 2, wherein the hook-and-loop attachment configuration includes a hook-and-loop portion that has hook-and-loop material on both upper and lower sides of the base belt.

4. The base belt of claim 1, wherein at least one of the trailer end and the unloader end is structured in a rod-and-strap attachment configuration that includes a hook-and-loop portion.

5. The base belt of claim 1, wherein the machine-readable belt identification tag includes machine-readable indicia that includes a model number of the base belt.

6. The base belt of claim 1, wherein the machine-readable belt identification tag is an RFID tag.

7. The base belt of claim 1, wherein a control system uses a belt identification reader to read the belt identification tag and thereby identify the base belt and characteristics of the base belt.

8. The base belt of claim 1, wherein a control system uses a belt identification reader to read the belt identification tag and thereby collects location and frequency-of-usage data for the base belt.

9. The base belt of claim 1, wherein a control system uses the belt identification tag to collect data for the base belt, and uses the collected data to predict at least one of end-of-life of the base belt, replacement times of the base belt, and possible failure of the base belt.

10. The base belt of claim 1, wherein a control system uses the belt identification tag to confirm that the base belt came from an approved source.

11. A base belt for use with an automated unloading apparatus that can automatically unload a container having a plurality of items located on the base belt, the base belt comprising:
  a trailer end configured to be removably attached to a container so that the trailer end remains attached to the container as the automated unloading apparatus travels along the base belt into the interior of the container;
  an unloader end configured to be routed over a nose ramp of the automated unloading apparatus and removably attached to the automated unloading apparatus; and
  a machine-readable belt identification tag that includes machine-readable indicia that identifies a serial number of the base belt,
  wherein the base belt is configured to be attached to a positioning member that holds the base belt in place along a rear wall of the container, and wherein the positioning member is one of a hook-and-loop fastener and an elastic element.

12. A base belt for use with an automated unloading apparatus that can automatically unload a container having a plurality of items located on the base belt, the base belt comprising:
  a trailer end configured to be removably attached to a container so that the trailer end remains attached to the container as the automated unloading apparatus travels along the base belt into the interior of the container;
  an unloader end configured to be routed over a nose ramp of the automated unloading apparatus and removably attached to the automated unloading apparatus; and
  a machine-readable belt identification tag that includes machine-readable indicia that identifies a serial number of the base belt, wherein the base belt includes a machine-readable end-of-travel tag.

* * * * *